United States Patent [19]

Salisbury

[11] 4,390,494
[45] Jun. 28, 1983

[54] DIRECTED BEAM FUSION REACTION WITH ION SPIN ALIGNMENT

[75] Inventor: Winfield W. Salisbury, Scottsdale, Ariz.

[73] Assignee: Energy Profiles, Inc., Newtown Square, Pa.

[21] Appl. No.: 138,139

[22] Filed: Apr. 7, 1980

[51] Int. Cl.³ .............................................. G21B 1/00
[52] U.S. Cl. ..................................... 376/107; 376/143; 376/127; 313/362.1; 313/363.1; 324/319; 315/111.41
[58] Field of Search ........................... 176/1, 2, 5, 4, 6; 324/300, 313, 319, 320; 313/359, 362, 363; 315/111.4, 111.61, 111.21, 111.41; 250/251, 423 R; 376/143, 107, 127

[56] References Cited

U.S. PATENT DOCUMENTS

| | | | |
|---|---|---|---|
| 2,589,494 | 3/1952 | Hershberger | 324/313 |
| 3,039,014 | 6/1962 | Chang | 176/4 |
| 3,039,049 | 6/1962 | Pinkley | 324/313 |
| 3,096,269 | 7/1963 | Halbach et al. | 376/127 |
| 3,132,996 | 5/1964 | Baker et al. | 176/6 |
| 3,238,413 | 3/1966 | Thom et al. | 315/111.61 |
| 3,286,162 | 11/1966 | Abragam et al. | 250/423 |
| 3,321,664 | 5/1967 | Phillips et al. | 176/3 |
| 3,418,206 | 12/1968 | Hall et al. | 176/2 |
| 3,445,333 | 5/1969 | Lecomte | 176/1 |
| 3,501,376 | 3/1970 | Dow et al. | 176/1 |
| 3,515,979 | 6/1970 | Golay | 324/319 |
| 3,530,036 | 9/1970 | Hirsch | 176/1 |
| 3,569,705 | 3/1971 | Kaminsky | 250/251 |
| 3,579,028 | 5/1971 | Paine | 315/111.21 |
| 3,643,181 | 2/1972 | Stirrat et al. | 324/300 |
| 4,189,346 | 2/1980 | Jarnagin | 176/5 |
| 4,202,725 | 5/1980 | Jarnagin | 176/5 |

FOREIGN PATENT DOCUMENTS

| | | | |
|---|---|---|---|
| 1291255 | 3/1962 | France | 176/2 |
| 873057 | 7/1961 | United Kingdom | 176/3 |
| 1012751 | 12/1965 | United Kingdom | 176/2 |

OTHER PUBLICATIONS

"Principles of Magnetic Resonance," by Slichter 1978, published by Springer-Verlag of Berlin, Heidelberg, N.Y. 1978, pp. 1, 2.
Van Nostrand's Scientific Encyclopedia, Fifth Ed. 1976, pp. 13-18.
Fundamentals of Electronic Motion, McGraw-Hill Book Co. Inc., 1953, pp. 161-162.
AIP Conf. Proc., No. 42, Ann Arbor, 1977, Krisch et al., pp. 136-141.

*Primary Examiner*—Harvey E. Behrend
*Attorney, Agent, or Firm*—Richards, Harris & Medlock

[57] ABSTRACT

A nuclear fusion system is disclosed wherein a pair of beams are to traverse common helical paths in a reaction zone. Two sources of oppositely directed gaseous ions are provided for producing the beams with means for establishing helical flow of ions in common paths whose spins are aligned in both beams.

10 Claims, 5 Drawing Figures

DIRECTED BEAM FUSION REACTION WITH ION SPIN ALIGNMENT

TECHNICAL FIELD

This invention relates to methods and systems for achieving nuclear fusion and, more particularly, to the enhancement of the probability of producing fusion reactions between particles traveling in opposite directions by the control of the ion spin orientation.

BACKGROUND ART

In Applicant's application Ser. No. 201,544 which is a division of Application Ser. No. 21,115 filed Mar. 16, 1979, now abandoned, an atomic fusion process is disclosed wherein two oppositely directed streams of ions are forced to follow the same helical paths in the same reaction zone for promoting fusion producing collisions between particles of one stream and particles of the other stream. By way of example, the streams may comprise deuterium and helium 3 ions, respectively.

The reaction zone comprises an annulus between an inner cylindrical electrode and an outer cylindrical electrode between which a radial electric field is established to control and maintain the streams in the helical path.

In such system, a pair of high density beams of ions is produced so that the likelihood of fusion producing collisions is enhanced relative to non-directed systems. The present invention is directed toward further enhancing the probability of such reactions. Use of ions traveling in opposite directions in essentially the same helical paths contrasts with other systems designed in attempts to achieve nuclear fusion reactions in which the particle travel and orientation are characterized as being random. By the present invention, this probability is enhanced by control of ion spin orientation.

DISCLOSURE OF THE INVENTION

In accordance with the invention, the nuclear magnetic moments of the streams of ions are polarized. The polarization is accomplished by projecting the ions from each ion source through a solenoidal magnetic field, the lines of flux of which are aligned in the direction of the ion motion. Ions entering this field precess about the magnetic flux lines at a frequency which depends upon their nuclear magnetic moment and the strength of the magnetic field. The precession signals are detected by a coil system placed with the axis thereof at right angles to the direction of the magnetic field. The precession signals picked up are amplified, shifted in phase and fed back further down the stream to extract precessional energy from the ions so that their magnetic moments become aligned in the direction of the motion, namely, the direction of the solenoidal magnetic field. The ions emerge from the solenoidal magnetic field aligned or spin oriented.

The spin oriented ions from two opposed sources are then injected at high velocity into spiral orbits and are then introduced into a cylindrical reaction zone traveling in opposed directions for bringing about fusion producing collisions.

The alignment of the ions, from all indications, causes an increase in the fusion reaction cross section of from 10 to 100 or more, as compared with the cross section for ion streams in which the nuclear magnetic moments are randomly oriented.

DETAILED DESCRIPTION

FIGURE 1

Figure 1:
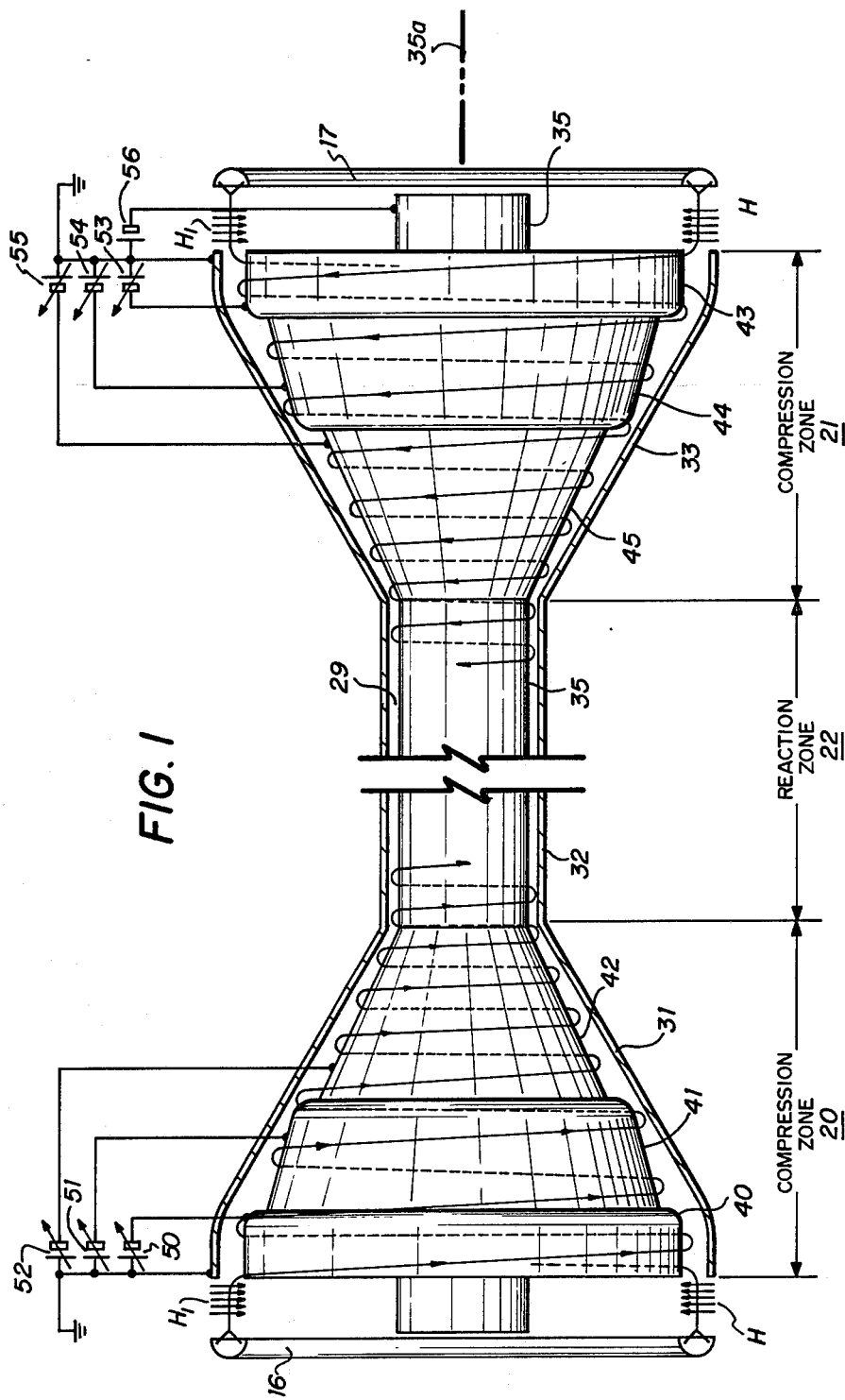
FIG. 1 is a sectional view of a reactor in which the invention is employed.

As described in U.S. Application Ser. No. 201,544, FIG. 1 comprises two ion sources 16 and 17 which face each other. Ion beams from sources 16 and 17 are accelerated parallel to a common reaction zone axis 35$a$. The beams each pass through a radial magnetic field $H_1$. The magnetic field H forces the ions into spiral paths about axis 35$a$ of a central electrode 35. Ions from source 16 travel in one direction along spiral paths and ions from source 17 travel in the other direction along like spiral paths. The beams are subjected to electrostatic fields which cause progressive decrease in the radii of the spiral paths. This causes compression of the beams. More particularly, outer housing members 31, 32, 33 are at a reference potential. Conical electrode 40 is at a negative potential as provided by DC source 50. Conical electrode 41 is at a negative potential as provided by DC source 51. Conical electrode 42 is at a negative potential as provided by DC source 52. Similarly, the potentials on electrodes 43–45 and on inner electrode 35 are established from sources 53–56, respectively. After compression, the beams enter an annular cylindrical reaction chamber 29 in which ions in the beam from source 16 travel in helical paths in collision courses with respect to ions in the beam from source 17.

If the ions from source 16 are deuterium ions and ions from the source 17 are helium 3 ions, then the following well known reaction will take place:

$$^2D + {}^3He \rightarrow {}^4He + p + 18.3 \text{ MeV} \tag{1}$$

Two particles result, i.e., a helium atom and a proton, plus 18.3 MeV of energy. The particles become no longer confined by the field and, thus, may escape to impinge the chamber wall. The energy is then absorbed at the boundaries of the reaction chamber 29. Heat may then be extracted through use of suitable heat exchangers.

Electrical fields applied in the compression zones 20 and 21, FIG. 1, are such as to force the ions into very thin highly compressed dense beams which orbit at a predetermined pitch or grade in chamber 29. Thus, each ion makes a plurality of orbits around central electrode 35 as it traverses reaction zone 22, with collisions resulting in fusion of the colliding particles.

The spaces in which the ions are generated, compressed and reacted are evacuated by conventional means, not shown. The electric fields in compression zone 20 and compression zone 21 are so tailored as to cause the two beams to follow the same helical paths through the reaction chamber 29. The paths shown in FIG. 1 have been shown as having a very coarse pitch. It is to be understood that this is for the purpose of illustration. In actual practice the pitch would be such that in the reaction chamber 29 there would be many orbits of the ions in one beam as they meet ions in the other beam at the same radius.

The electric fields between the outer shell 31, 32, 33 and the various electrodes are tailored in compression zones 20 and 21 to force a gradual decrease in the diameter of the spiral paths as the beams travel from sources 16 and 17 to the points where they enter reaction chamber 29. More or fewer discrete compression fields may be imposed on the ion beam. The specific configuration will depend upon particular design desired.

FIGURE 2

Figure 2:
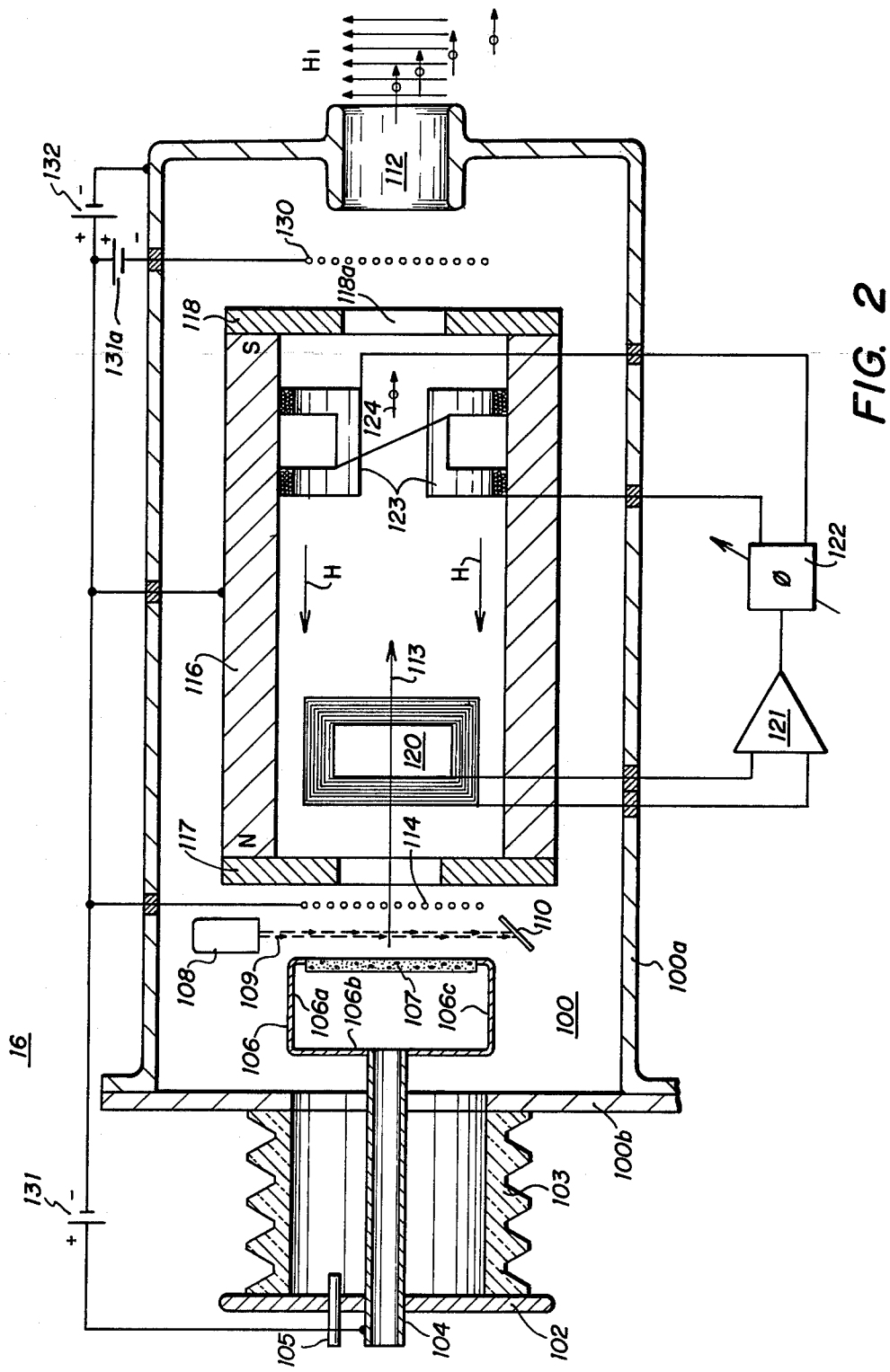
FIG. 2 is a sectional view of a portion of the source of FIG. 1 in which spin alignment is produced.

The system of FIG. 2 is a sectional view of a cylindrical source to be used in connection with the system of FIG. 1.

Source 16, FIG. 2, provides a pencil-like beam of ions. It includes structure forming a cylindrical chamber 100. Included is an annular cup 100a and a closure ring 100b. Positioned behind closure ring 100b is a support disc 102 which is mounted on and supported by closure ring 100b by a supporting insulator 103. A gas inlet tube 104 extends through the support disc 102 and extends into and supports a circular feed gas manifold 106. A cable 105 passes through a suitable fitting, not shown, in disc 102 to supply power and control voltages to electrodes of source 16.

Feed gas manifold 106, like chamber 100, is a cup formed by impervious walls 106a, 106b and 106c and a front closure disc 107 which is a permeable barrier disc through which gas from tube 104 which is used in the system may pass. Immediately in front of the permeable barrier disc 107 is an ion extraction grid 114. An electron gun 108 is provided as to direct a sheet of electrons 109 between barrier disc 107 and extraction grid 114 and toward an electron catcher 110.

In operation, a selected gas such as helium 3 is introduced through inlet tube 104 into the gas manifold 106. The atoms of the gas then pass through the barrier disc 107 at a rate responsive to the pressure of the gas in the manifold 106. The atoms of the gas emerging from the barrier disc 107 are bombarded by electrons in the beam 109 to ionize them. A negative potential on the extraction grid 114 accelerates the ions to form an ion beam 113 and repels electrons back toward the barrier disc 107.

As they pass through the opening in an end plate 117, the ions in beam 113 have magnetic moments which are random in orientation. In accordance with the present invention, the ions are polarized before exiting through outlet port 112.

Polarization of nuclear particles is accomplished by projecting beam 113 through a solenoidal magnetic field H. Field H is produced by cylindrical magnet 116 having apertured end plates 117 and 118 aligned in the direction of the ion motion. Ions in beam 113 entering field H will precess around the magnetic flux lines at a frequency which depends upon their magnetic moment and the strength of the magnetic field. The ion precession is detected by a pair of coils 120 (only one of which is shown in FIG. 2). Coils 120 have their axes at right angles to the magnetic field H. The precession signal picked up is amplified in unit 121, shifted in phase in unit 122 and fed back further down the stream in coils 123 as to extract the precessional energy from the ions. Thus, the magnetic moments of the ions become aligned in the direction of their motion, which is the same direction as the solenoidal magnetic field H. A rapid decrease in field H at the end of magnet 116 allows the ions to emerge from it still aligned.

It will be noted in FIG. 2 that the coils 120 and 123 are positioned against the inner walls of the magnet 116 and, thus, conform to the inner wall configuration. They are partly cylindrical in shape. However, as viewed along the axis of each coil, they are of rectangular shape. The particular shape of coils 120 and 123 is not critical. Coil 120 will be connected in series aiding relationship with its companion coil, not shown in FIG. 2. Coils 123 likewise are connected in series aiding relation and are energized from the output of phase adjustment unit 122. The phase of the output from amplifier unit 121 is adjusted in unit 122 to cause currents in coils 123 to produce fields inside magnet 116 that are opposite in phase to the precessional field produced by the ions as they approach the exit port 118a in plate 118. The precessional energy is then absorbed in the output circuit of the units 121, 122.

The fields from pickup coils 120 and feedback field coils 123 are arranged to impose high frequency perturbations on the field H. If the feedback fields were not provided, the atomic nuclei passing through the region where H is applied would precess about the lines of H and would return to their individual original orientations at random after passing through the H region. Unless there is an intervening disturbance the precessional energy imparted to the ions by the fields during entrance is exactly returned to the field during exit from the field. If the nuclei were large enough in comparison to the space wave length of their precessional frequency they would radiate away the precessional energy and become aligned with H. Since this size requirement is not met in the system shown by many orders of magnitude, the special perturbation fields from feedback coils 123 are provided to assure alignment. The rate at which precessional energy is radiated in an unperturbed volume is given by $$(dE/dt = -K(a/\lambda)^4$$

where K is a radiation constant, a is the atomic dimension, and $\lambda$ is the space wave length of the precessional frequency.

The ratio $(a/\lambda)$ is very small in magnetic fields in practical use, so this small factor raised to the fourth power is completely negligible in any practical size of apparatus. Thus, nuclei passing through the H field where no perturbation field is provided, return exactly to the original state which they had on entering field H as they leave field H.

Thus, because of perturbation fields the ions represented by the symbol 124 emerge from the confines of magnet 116 with the spin axis thereof parallel to the magnetic field H.

Immediately downstream of the exit port 118a and plate 118 is a second accelerating grid 130. Grids 114 and 130, as well as magnets 116, are maintained at a negative potential relative to the manifold 106. Sources 131 and 131a provide the necessary voltages.

Voltage sources 131a and 132 are connected between the output grid 130 and the chamber member 100a, so that the ions passing through the grid 130 are accelerated to a fusion producing velocity as they pass through grid 130 and output port 112. As in U.S. Application Ser. No. 201,544, the ions emerging from output port 112 are forced into a spiral trajectory as they pass through an output magnetic field $H_1$ which is oriented as to have its flux lines perpendicular to the direction of the field H inside magnet 116. As the ions then traverse a spiral path leading to a reaction zone, as described in said U.S. Application Ser. No. 201,544, the spin remains aligned parallel to the direction of the magnetic field H.

It will be understood that the unit shown in FIG. 2 represents a source that would be employed on one end of a fusion reactor. If helium 3 ions are used in the unit of FIG. 2, then a similar unit on the other end of the reactor operating with deuterium ions would be employed to bring about a desired fusion reaction in the reaction zone. While other ions known to be suitable for fusion reactions may be employed, Helium 3 and deuterium are described herein as exemplary and constitute the materials employed in a preferred form of the invention.

FIG. 3

Figure 3:
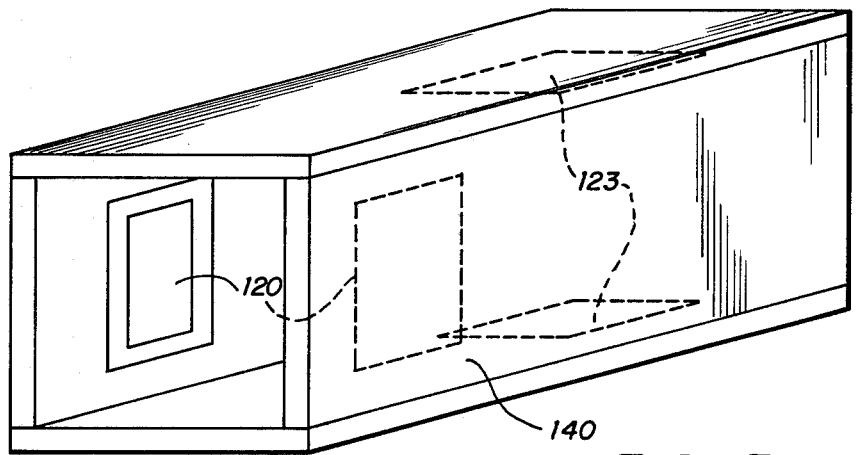
FIG. 3 illustrates a modification of a spin aligning field generator.

There may be variations in the specific arrangements in systems employed for establishing ion spin alignment. In FIG. 2 a cylindrical permanent magnet has been illustrated. It will be appreciated that the magnet need not be cylindrical, but could be rectangular as shown in FIG. 3. In FIG. 3, the coils 120 are mounted inside the magnet with their axes aligned and perpendicular to the direction of the magnetic field inside the magnet 140. It will also be noted that coils 123 are mounted on the inner walls of the magnet 140 with their axes perpendicular to the direction of the field in magnet 140 and perpendicular to the axes of coils 120. As above explained, the coils 120 are connected in series aiding relationship that provide the input signal to amplifier 121. The coils 123 are connected in series aiding relationship and are driven by the output from the phase adjustment unit 122.

FIG. 4

Figure 4:
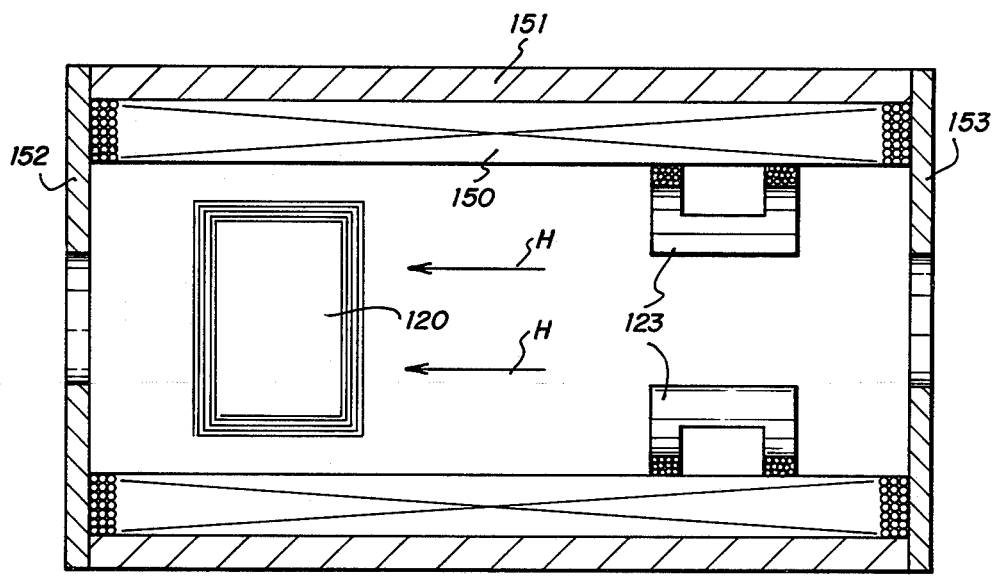
FIG. 4 illustrates a modified form of system employing a solenoid for producing the spin aligning field.

In FIG. 4 a solenoid has been illustrated which may be used in place of the magnet 116 of FIG. 2. More particularly, an elongated cylindrical (or rectangular) winding 150 is encased in a magnetic housing 151 having apertured end plates 152 and 153. The winding 150, suitably energized, will produce magnetic field H, the same as shown in FIG. 2.

FIG. 5

Figure 5:
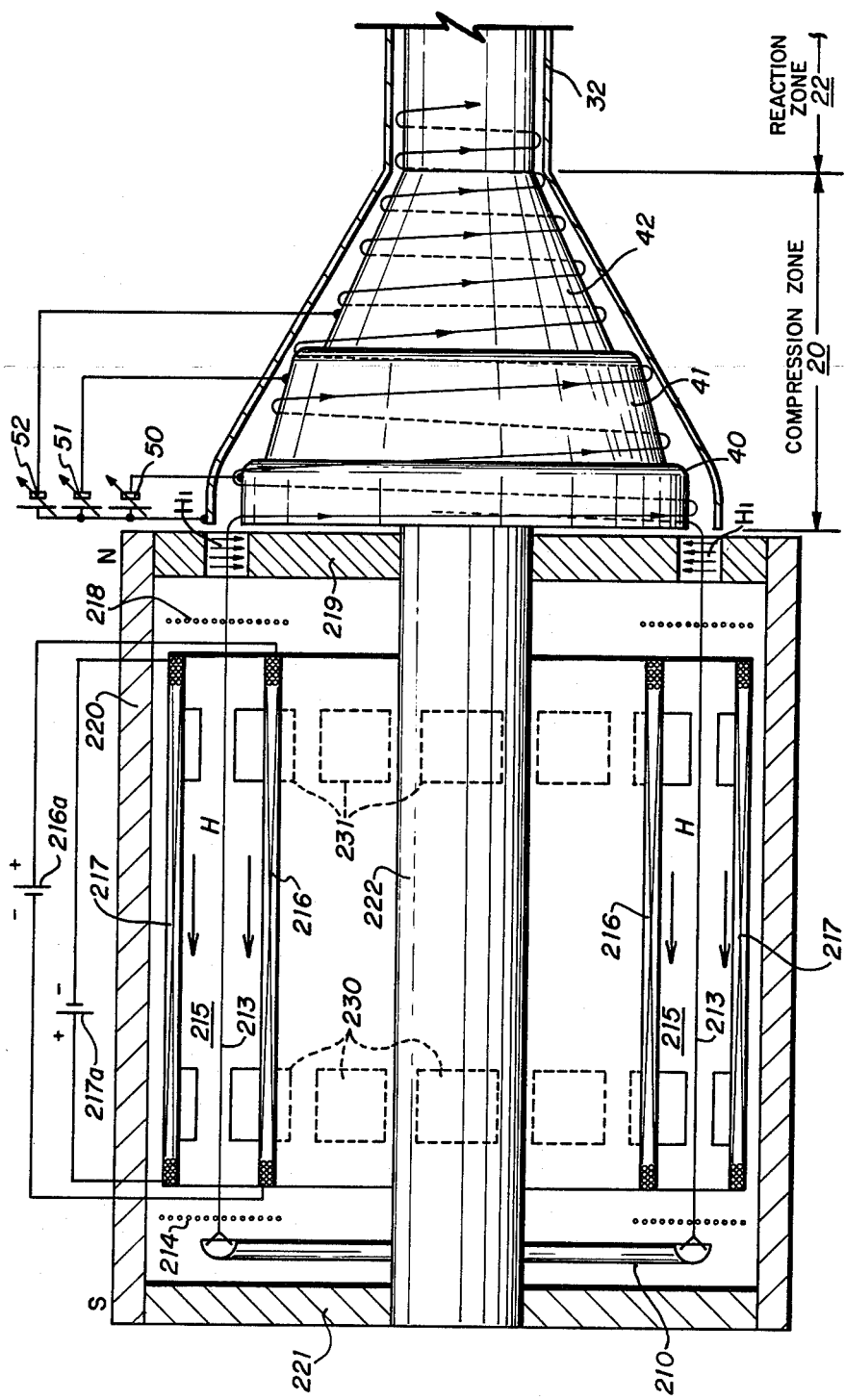
FIG. 5 illustrates a further modification of an ion source embodying the invention.

FIG. 5 illustrates a spin alignment system in an embodiment wherein a ring or circular source 210 of ions is employed. A circular ring grid 214 accelerates ions from source 210 through an annular chamber 215, which comprises a space between an inner coil 216 and an outer coil 217. For simplicity, the ionizing beam of electrons 109 of FIG. 2 has been omitted from FIG. 5, it being understood that a cylindrical beam of ions 213 passes through chamber 215. Coil 216 is energized from a DC source 216a, whereas coil 217 is energized by DC source 217a. The voltages and windings in coils 216 and 217 are such that the field inside coil 216 is cancelled, whereas the fields from coils 216 and 217 are additive in the chamber 215, so that the ions precess around the magnetic field and tend to become aligned with the field as they pass through the annular chamber 215. An output grid 218 is maintained at an accelerating potential as is grid 214 and serves to accelerate ions outward to an aperture in the magnetic end plate 219. An outer cylindrical magnet 220 cooperates with end plate 219, end plate 221 and the central cylindrical bar 222 to maintain the magnetic field $H_1$ in the circular aperture in the end plate 219 so that the ions are then caused to follow a spiral path leading to the central reaction zone 22, passing through compression zone 20.

While not shown in detail, a plurality of pairs of coils 230 are mounted on the inner wall of the outer coil 217 in the region of the source 210. Companion coils, one facing each of the coils 230, are mounted on the outer surface of the coils 216 and perform the functions as above described in connection with coils 120 and 123 of FIG. 2. Similarly, coils 231 and companion coils (not shown) perform the functions as above described in connection with coils 123. Thus, in this embodiment a circular source 210 is utilized to provide a cylindrical beam of ions passing through the annular chamber 215 for alignment of the moments, thereby to enhance the cross section of the fusion reactions in the reaction zone 22.

Thus, the field with which the ions become aligned is created in one case by a current carrying solenoid which encloses a single beam of nuclear particles. The magnet shown in FIG. 2 can be formed of a stack of magnetized rings so that for a column down the center of the rings a uniform magnetic field is present.

As shown in FIG. 5, the fields in the space between the two large solenoids are aiding to produce the necessary field H in the annular space between the two solenoids. This will adapt itself to the polarization of the annular ion beam. The beam is surrounded by a larger magnetic structure so that it exits that structure through a gap across which a magnetic field $H_1$ exists. The field $H_1$ turns the ions in the beam at right angles to their normal motion and imparts angular momentum to them. The angular momentum is preserved, since the beam enters a space where radial magnetic fields balance the centrifugal forces fue to angular momentum against the inward radial electric forces. The course of the ions through the magnetic field in the annulus will leave them aligned perpendicular to the direction of motion in the spiral orbit for entry into the coaxial space where the radial electric field keeps them confined. A similar arrangement at the opposite end of the reactor provides a set of ions, also aligned, which travel in the opposite direction. Thus, oppositely traveling particles can meet with their magnetic moments either aligned parallel or antiparallel. The extra gain in nuclear reaction cross section achieved by having the particles aligned antiparallel will be such a great factor that the losses of cross section due to those aligned parallel will be insignificant. The result is a large increase in the average nuclear reaction cross section of the two beams. Variations of this system are possible and may add significantly to its operation. It may be desirable to reduce the strength of the aligning field so that the particles will move slowly in order for the precessing ions to interact and become aligned. In such case, it is desirable to first accelerate the ions in the aligning magnetic field with a low energy, of the order of one to ten kilovolts. At the end of the aligning process they can be accelerated to the full energy needed to produce the reaction in the reaction space.

In this system where the beam is of particles of one sign only, the debye length is infinite and the scattering forces between two particles are merged by the antiscattering fields of all the other particles in the two streams.

Having described the invention in connection with certain specific embodiments thereof, it is to be understood that further modifications may now suggest themselves to those skilled in the art, and it is intended to cover such modifications as fall within the scope of the appended claims.

I claim:

1. In a fusion reaction system where ions from two sources are forced by passage through magnetic fields to travel helically towards each other in opposite senses of rotation and directions at a common radius in a cylindrical annular reaction zone defined by two coaxial spaced apart cylindrical electrodes, the improvement comprising:
    (a) establishing a low velocity beam of gaseous ions from each said source;
    (b) aligning the spins of said ions while at said low velocity to produce polarized ion beams;
    (c) accelerating said ions in said polarized ion beams to fusion velocities for injection into said reaction zone;
    (d) applying said magnetic fields to cause opposite directional travel of said ions in said polarized ion beams;
    (e) establishing a D.C. radially directed electrostatic field between said coaxial cylindrical electrodes for confining said beams to said helical paths and compressing said ion beams, said D.C. electrostatic field being applied as the confining field free of any applied magnetic field in said annular reaction zone; and
    (f) injecting each of said two oppositely directed polarized ion beams into said zone.

2. The method set forth in claim 1 wherein the alignment of ions in both beams is parallel to the axis of said reaction zone.

3. The method of claim 1 wherein the ion beams are of cylindrical configuration.

4. The method of claim 1 wherein the magnetic moments of ions in each said beam are sensed upstream in each source and spin energy is absorbed downstream in each source to bring magnetic moments in each said stream into a predetermined condition.

5. In the generation of energy from fusion of atomic nuclei where two beams of fusible gaseous ions travel opposed in rotation along helical paths having common axes, radii and space for collision of ions in one beam with ions of the other beam in a cylindrical annular reaction zone defined by two coaxially spaced apart cylindrical electrodes, the improvement which comprises:
    (a) establishing two low velocity beams of gaseous ions;
    (b) establishing a predetermined ion spin alignment for ions in said beams so as to form two polarized ion beams, and accelerating the ions in each of said two polarized ion beams;
    (c) causing said two polarized ion beams to travel toward each other opposed in rotation along said helical paths;
    (d) establishing a D.C. radially directed electric field between said coaxial cylindrical electrodes for the ions in confining said beams to orbital paths and compressing said beams, said D.C. electric field being applied as the confining field free of any applied magnetic field in said annular reaction zone; and
    (e) injecting each of two oppositely directed polarized ion beams into said reaction zone.

6. In a nuclear fusion system wherein a pair of beams are to traverse common helical paths in a cylindrical annular reaction zone defined by two coaxial spaced apart cylindrical electrodes, the combination therewith which comprises:
    (a) two sources of oppositely directed low velocity gaseous ions for producing said beams;
    (b) means for aligning the spins of the ions in each said beam for producing two oppositely directed polarized low velocity ion beams;
    (c) means for accelerating the ions in each of said two low velocity polarized ion beams;
    (d) means for establishing a D.C. radially directed electric field between said coaxial cylindrical electrodes for confining the ions in said beam to said paths and compressing said beams, said D.C. electric field being applied as the confining field free of any applied magnetic field in said annular reaction zone; and
    (e) means for causing the ions in each of said two oppositely directed ion beams to traverse said common helical paths and enter said annular reaction zone.

7. The system of claim 6 in which the axis of said paths and the axes of spin of said ions upon achieving said alignment are parallel.

8. The system of claim 7 in which said sources each include:
    (a) sensing means to respond to nuclear spin upstream in said beams; and
    (b) means responsive to said sensing means to oppose unwanted spin downstream in said beams to produce a predetermined spin alignment of each of said beams.

9. The system of claim 8 in which said sources each comprise:
    (a) a repository of releasable ionizable atoms;
    (b) means to actuate said repository;
    (c) means to ionize atoms emanating from said repository;
    (d) electron beam means to bombard said ions to ionize said atoms;
    (e) means to accelerate said ions along a selected path;
    (f) means to establish a magnetic field in which flux lines thereof are parallel to said selected path;
    (g) means to change the nuclear spin of said ions for alignment parallel to said slecected path; and
    (h) means to direct said aligned beams to said reaction zone.

10. In a fusion reaction system where ions from two sources are to pass through magnetic fields and electrostatic fields for helical travel toward each other on a common axis while rotating in opposite senses in orbital paths at a common radius in an annular reaction zone of circular symmetry at any given corss-section perpendicular to the axis of said paths and bounded by spaced apart outer and inner coaxial electrode walls for promoting collisions of ions in one beam with ions in the other beam, the improvement comprising:
    (a) establishing a low velocity beam of gaseous ions from each said source;
    (b) aligning the spins of said ions while at said low velocity to produce polarized ion beams;
    (c) extracting aligned ions free of electrons;
    (d) accelerating said extracted ions in said ion beams;
    (e) applying said magnetic fields to direct opposite travel of said accelerated ions in said polarized beams toward said orbital paths;

(f) establishing a D.C. radially directed electrostatic field between said electrodes for confining said ion beams to said orbital paths free of negatively charged particles and where said D.C. field is applied as the confining field free of any applied magnetic field; and (g) injecting each of said two oppositely directed polarized ion beams into said zone.

* * * * *